3,200,389
LIQUID LEVEL INDICATOR
Frank A. Damico and Robert T. Norton, Reading, Pa., assignors to Western Electric Company, Incorporated, New York, N.Y., a corporation of New York
Filed Oct. 20, 1961, Ser. No. 146,584
5 Claims. (Cl. 340—244)

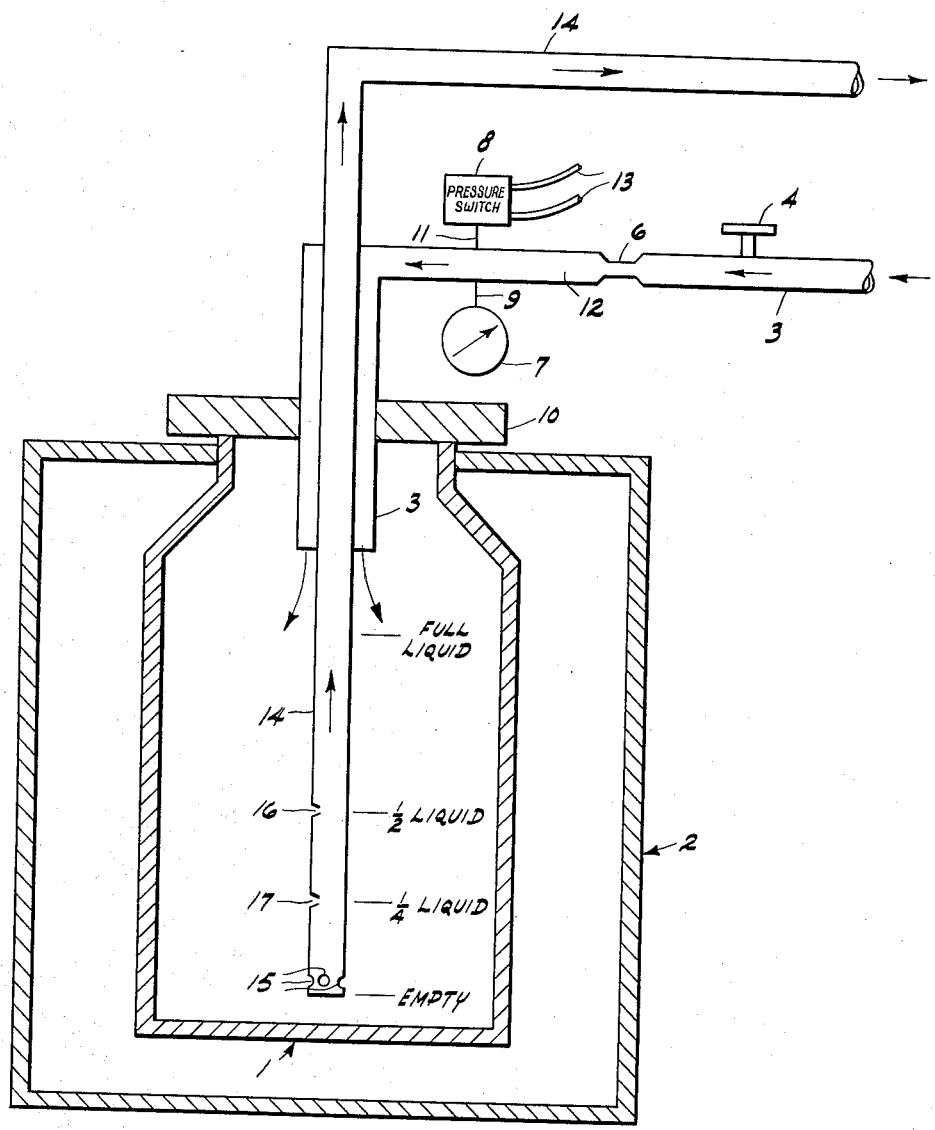

This invention relates to a method and apparatus for indicating the level of a fluid, as for example liquid nitrogen in a pressurized container; and has for an object the provision of a suitable warning when such level falls to a predetermined point in the container. This is, of course, of obvious importance in many instances and especially so in various manufacturing processes wherein liquid nitrogen is utilized, and exhaustion or substantial depletion of the supply thereof without suitable warning can, in some cases have serious and costly consequences.

In general, the invention comprises a pressure responsive signalling means cooperatively associated with a pressurized container from which fluid is being dispensed to one or more points of utilization, and operable to furnish visible and audible indications of one or more of a plurality of predetermined levels of the fluid within such container.

The above and other objects of the invention and the advantages thereof may be more readily understood by reference to the accompanying detailed drawing wherein the figure is a sectional view through a pressurized container incorporating the present invention.

Referring now to such drawing, the invention is seen to comprise a container 1, of the Dewar type, surrounded by a vacuum jacket 2 to prevent heat transfer, and covered by a weighted cap 10. The container is pressurized by gaseous nitrogen drawn from any convenient source (not illustrated) and introduced thereto through inlet line 3 mounted in the weighted cap. Line 3 includes an adjustable pressure regulator 4 which, when set, maintains a constant inlet pressure in the line, and an orifice 6 which functions to provide a pressure drop in the line, the magnitude of which is, of course, directly proportional to the quantity of the gaseous nitrogen flowing through the orifice.

The static pressure at point 12 in line 1 is effectively communicated to a pressure gage 7 and an adjustable pressure switch 8 by branch lines 9 and 11, respectively, with gage functioning to provide visible indication of such pressure and the level of liquid nitrogen within the container, and the switch functioning to activate audible and/or visual alarm means (not shown) through conductors 13 when such pressure has fallen to a predetermined minimum.

Mounted concentrically within gaseous nitrogen line 3 is liquid nitrogen outlet line 14 wherein are formed inlet holes 15, and orifice 16, and orifice 17 for purposes set forth in detail herein-below.

In operation, container 1 is filled with liquid nitrogen to the level of a line designated Full Liquid. The weighted cap assembly, including inlet line 3 and outlet line 14 is then placed atop the container and maintained in position thereon solely by the force of gravity to thus function as a pressure relief valve in the event pressure in the container should, for some reason such as an obstruction in outlet line 14 or malfunction of pressure regulator 4, increase beyond a predetermined maximum.

Gaseous nitrogen from any convenient source is then applied to inlet line 3 and the pressure thereof maintained at a constant and predetermined level by proper adjustment of pressure regulator 4. The gaseous nitrogen then flows through orifice 6 wherein a pressure drop occurs due to the conversion of the pressure energy of the fluid to velocity energy. The magnitude of such pressure drop is of course, directly proportional to the quantity of gaseous nitrogen flowing through the orifice in that such quantity is, by and large determinative of the increase in velocity and corresponding decrease in pressure. Thus, it is seen that for a relatively small quantity of flow through orifice 6, there will be a small pressure drop through the orifice and the pressure of the gaseous nitrogen at point 12 in line 3 and, accordingly that at the pressure gage and pressure switch, will almost equal the constant pressure at pressure regulator 4. Conversely, for a relatively large quantity of flow of gaseous nitrogen through the orifice there will be a large pressure drop and the pressure at the gage and switch will be appreciably less than the constant pressure at the regulator.

After flowing through the orifice 6, the gaseous nitrogen flows out of the end of line 3 into the container, thus functioning to exert a pressure on the surface of the liquid nitrogen contained therein with resultant flow of the latter through holes 15 in line 14 to one or more points of utilization.

Of course, as the liquid nitrogen is dispensed from the container, the level thereof continues to fall until the same is below and uncovers the holes 15 in the end of line 14 and no further flow thereof is possible. Such uncovering of the holes 15 also has another important effect, to wit, it enables greatly increased flow of the gaseous nitrogen through inlet line 3 into the container and out line 14. This greatly increased flow in turn effects a greatly increased pressure drop through orifice 6 with resultant lower pressure at point 12 and the pressure gage and switch, with the former functioning to provide visual indication of the drop in the level of the liquid nitrogen and the latter to provide, through conductors 13, audible and/or visual indication thereof by well-known means (not shown) such as an alarm bell or light.

However, it is to be noted that orifices 16 and 17 are, of necessity, uncovered in that order by the fall of the liquid nitrogen level prior to the uncovering of the holes 15. Although such orifices are of much less area than such holes, it has been determined that a sufficient quantity of gaseous nitrogen will flow through the orifices upon the uncovering thereof to measureably increase the flow and resultant pressure drop through orifice 6, and accordingly, the pressure at point 12 and the adjustable gage and switch. Thus, it may be readily appreciated that the adjustable pressure switch may be set to actuate the aforementioned alarm means when the pressure at the switch has fallen to a predetermined value indicative of the uncovering of the holes 15 and the depletion of substantially all of the liquid nitrogen supply; the uncovering of orifice 16 and the depletion of ½ of the liquid nitrogen supply; or the uncovering of orifice 17 and the depletion of ¾ of the liquid nitrogen supply as may prove desirable. It is here noted that the present invention contemplates the incorporation of various and well-known shut down means (not illustrated) operable by the pressure switch and effective to isolate the system from the point of utilization of the liquid nitrogen and/or discontinue the manufacturing processes to which the liquid nitrogen is being supplied when the level thereof within the container has fallen below a predetermined minimum.

Various changes may obviously be made in the disclosed invention without departing from the spirit and scope thereof. For example, one or more additional orifices may be provided in line 14 and utilized in the manner of orifices 16 and 17 to indicate various other liquid nitrogen levels within the container. Conversely, the orifices may be eliminated entirely from line 14, whereby the device will function to provide suitable warning only upon substantially complete depletion of the liquid nitrogen supply.

What is claimed is:

1. Apparatus for discharging liquid from a closed container while simultaneously monitoring the level of the remaining liquid contained therein, which comprises: an outlet line for discharge of said liquid, said outlet line extending into said container to a point above a prescribed minimum liquid level and having at least one orifice formed therein below a prescribed maximum liquid level; means including an inlet line for introducing gas under pressure into said container to discharge the liquid therefrom through said outlet line, the pressure of the gas within a portion of said inlet line remaining essentially constant until the level of the remaining liquid in said container drops below and uncovers said orifice, whereupon a substantial drop of the pressure in said inlet line portion results; and, means coupled to said inlet line portion and responsive to the pressure of the gas flowing therethrough for indicating the uncovering of said orifice.

2. Apparatus in accordance with claim 1 wherein: said gas introducing means further comprises a pressure regulator at the entrance end of said inlet line for maintaining a constant pressure thereat and a restricted orifice disposed in said inlet line downstream of said pressure regulator and upstream of said inlet line portion for causing a pressure drop of a magnitude directly proportional to the quantity of gas flowing through said inlet line.

3. Apparatus for discharging liquid from a closed container while simultaneously monitoring the level of the remaining liquid contained therein, which comprises: an outlet line for discharge of said liquid, said outlet line extending into said container to a point above a prescribed minimum liquid level and having a plurality of orifices formed in the sidewall thereof, each of said orifices being below a prescribed maximum liquid level and representing a different point of liquid depletion, means including an inlet line for introducing gas under pressure into said container to discharge the liquid therefrom through said outlet line, the pressure of the gas within a portion of said inlet line dropping each time the level of the remaining liquid falls below and uncovers one of said orifices; and means coupled to said inlet line portion and responsive to the pressure of the gas flowing therethrough for indicating the uncovering of said orifices.

4. Apparatus for discharging liquid from a closed container while simultaneously monitoring the level of the remaining liquid contained therein, which comprises: an outlet line for discharge of said liquid, said outlet line extending into said container to a point above a prescribed minimum liquid level and having a plurality of orifices formed in the sidewall thereof, each of said orifices being below a prescribed maximum liquid level and each being at a different point of liquid depletion; means including an inlet line for introducing gas under pressure into said container to discharge the liquid therefrom through said outlet line, the pressure of the gas within a portion of said inlet line dropping each time the level of the remaining liquid falls below and uncovers one of said orifices; pressure responsive means coupled to said inlet line portion for continuously indicating the pressure of the gas flowing through said inlet portion; and, means coupled to said inlet line portion and responsive to a predetermined pressure for indicating the uncovering of a predetermined one of said orifices.

5. Apparatus in accordance with claim 4 wherein: said gas introducing means further comprises a pressure regulator at the entrance end of said inlet line for maintaining a constant pressure thereat and an orifice disposed in said inlet line downstream of said pressure regulator and upstream of said inlet line portion for causing a pressure drop of a magnitude directly proportional to the quantity of gas flow through said inlet line; said continuously indicating means includes a pressure gage; and, said means for indicating the uncovering of a predetermined one of said orifices includes a pressure switch.

References Cited by the Examiner

UNITED STATES PATENTS

| 1,977,969 | 10/34 | McIntosh. | |
| 2,002,101 | 5/35 | Valby et al. | 73—53 |
| 2,252,687 | 8/41 | Bassett | 73—198 XR |
| 2,891,625 | 6/59 | Hube | 340—240 XR |
| 2,963,906 | 12/60 | Bailey | 73—205 |

NEIL C. READ, *Primary Examiner.*